(12) United States Patent
Li et al.

(10) Patent No.: US 12,083,508 B2
(45) Date of Patent: Sep. 10, 2024

(54) SUPPORTED TRANSISTION METAL CARBIDE CATALYST AND ONE-STEP SYNTHESIS METHOD THEREOF

(71) Applicant: NORTHWEST UNIVERSITY, Xi'an (CN)

(72) Inventors: Shuang Li, Xi'an (CN); Xichao Fu, Xi'an (CN); Yuying Li, Xi'an (CN)

(73) Assignee: NORTHWEST UNIVERSITY, Xi'an (CN)

( * ) Notice: Subject to any disclaimer, the term of this patent is extended or adjusted under 35 U.S.C. 154(b) by 176 days.

(21) Appl. No.: 17/272,942

(22) PCT Filed: Nov. 23, 2018

(86) PCT No.: PCT/CN2018/117081
§ 371 (c)(1),
(2) Date: Mar. 3, 2021

(87) PCT Pub. No.: WO2020/048019
PCT Pub. Date: Mar. 12, 2020

(65) Prior Publication Data
US 2021/0322960 A1    Oct. 21, 2021

(30) Foreign Application Priority Data

Sep. 3, 2018 (CN) .......................... 201811021033.9

(51) Int. Cl.
*B01J 27/22* (2006.01)
*B01J 21/04* (2006.01)
(Continued)

(52) U.S. Cl.
CPC .............. *B01J 27/22* (2013.01); *B01J 21/04* (2013.01); *B01J 35/615* (2024.01); *B01J 35/633* (2024.01);
(Continued)

(58) Field of Classification Search
CPC ........ B01J 27/22; B01J 21/04; B01J 35/1019; B01J 35/1038; B01J 35/1061; B01J 37/0219; B01J 37/086; B01J 37/18
(Continued)

(56) References Cited

FOREIGN PATENT DOCUMENTS

| CN | 1176312 A | 3/1998 |
|----|-----------|--------|
| CN | 1768939 A | 5/2006 |

(Continued)

OTHER PUBLICATIONS

English translation of CN 104226353A . (Year: 2014).*
(Continued)

*Primary Examiner* — Sheng H Davis
*Assistant Examiner* — Catriona M Corallo
(74) *Attorney, Agent, or Firm* — Bayramoglu Law Offices LLC

(57) ABSTRACT

A supported transition metal carbide catalyst and a one-step synthesis method thereof are disclosed. The synthesis method includes: mixing a supporter, a transition metal precursor and a solid carbon source and then grinding to form a solid mixture; and putting the solid mixture into a reducing atmosphere, performing carbonization treatment and high-temperature programming thermal treatment in turn, and then at a protective atmosphere, cooling and passivating, so as to obtain the supported transition metal carbide catalyst. The synthesis method provided by the present application utilizes high-temperature solid solution reaction for further synthesis, which at least has the following advantages: the preparation process flow is simple so processes such as impregnation and carburization with gas carbon source can be avoided; different supporters used for catalyst modification, and the prepared catalyst has the characteristics of large outer surface area, rich notable metal-like catalytic property and the like.

15 Claims, 2 Drawing Sheets

(51) Int. Cl.
- *B01J 35/61* (2024.01)
- *B01J 35/63* (2024.01)
- *B01J 35/64* (2024.01)
- *B01J 37/02* (2006.01)
- *B01J 37/08* (2006.01)
- *B01J 37/18* (2006.01)

(52) U.S. Cl.
CPC ......... *B01J 35/647* (2024.01); *B01J 37/0219* (2013.01); *B01J 37/086* (2013.01); *B01J 37/18* (2013.01)

(58) Field of Classification Search
USPC ....................................................... 502/177
See application file for complete search history.

(56) References Cited

FOREIGN PATENT DOCUMENTS

| | | | | |
|---|---|---|---|---|
| CN | 1867404 | A | 11/2006 | |
| CN | 101371988 | A | 2/2009 | |
| CN | 102604668 | A | 7/2012 | |
| CN | 104226353 | A | 12/2014 | |
| CN | 105214704 | A | 1/2016 | |
| CN | 105797757 | A | 7/2016 | |
| CN | 107158900 | A * | 9/2017 | ........... B01D 53/326 |
| CN | 108163857 | A | 6/2018 | |
| WO | 2014148679 | A1 | 9/2014 | |

OTHER PUBLICATIONS

English translation of CN 1768939A. (Year: 2006).*
Machine Translation of CN 101371988 A. (Year: 2009).*
Machine Translation of CN 102604668 A. (Year: 2012).*
Machine Translation of CN 107158900 A. (Year: 2017).*
Tang et al. "High specific surface area Mo2C nanoparticles as an efficient electrocatalyst for hydrogen evolution", Journal of Power Sources 296 (2015), p. 18-22. (Year: 2015).*
Pang et al. "Activated carbon supported molybdenum carbides as cheap and highly efficient catalyst in the selective hydrogenation of naphthalene to tetralin", Green Chemistry 14 (2012), p. 1272-1276. (Year: 2012).*
Leclercq et al. "Catalytic Properties of Transition Metal Carbides", Journal of Catalysis 117 (1989), p. 371-383. (Year: 1989).*
Alaba et al. "Molybdenum carbide nanoparticle: Understanding the surface properties and reaction mechanism for energy production towards a sustainable future", Renewable and Sustainable Energy Reviews 91 (Mar. 2018), p. 287-300. (Year: 2018).*
Machine Translation of CN 1768939 A. (Year: 2006).*
Gu et al. "Effect of Glucose on the Synthesis of Iron Carbide Nanoparticles from Combustion Synthesis Precursors". Journal of the American Ceramic Society, 99 [4] (2016) p. 1443-448 (Year: 2016).*
Wang et al. "Chitosan: a green carbon source for the synthesis of graphitic nanocarbon, tungsten carbide and graphitic nanocarbon/tungsten carbide composites". Nanotechnology 21 (2010) 0256006, p. 1-9 (Year: 2010).*
Masatoshi Nagai, et al., CO Adsorption on Molybdenum Carbides and Molecular Simulation, Langmuir 2000, pp. 10215-10220, 16.
Hongfen Wang, et al., Preparation of molybdenum carbides with multiple morphologies using surfactants as carbon sources, Journal of Solid State Chemistry, 2012, pp. 19-22, 194.

* cited by examiner

SUPPORTED TRANSISTION METAL CARBIDE CATALYST AND ONE-STEP SYNTHESIS METHOD THEREOF

CROSS REFERENCE TO THE RELATED APPLICATIONS

This application is the national phase entry of International Application No. PCT/CN2018/117081, filed on Nov. 23, 2018, which is based upon and claims priority to Chinese Patent Application No. 201811021033.9, filed on Sep. 3, 2018, the entire contents of which are incorporated herein by reference.

TECHNICAL FIELD

The present application relates to a supported transition metal carbide catalyst, particularly to a one-step method for synthesizing the supported transition metal carbide catalyst by utilizing a high-temperature solid solution reaction, belonging to the technical field of industrial catalysis.

BACKGROUND

Platinum and its adjacent elements in a periodic table of elements, as catalysts, are widely applied to the chemical industry fields of chemical synthesis, petrochemical industry, polymerization, environmental protection and the like. However, platinum group metals or VIII group transition metals, especially notable metals such as platinum, palladium, rhodium and ruthenium, has decreased reserves with years and increased quantity demand with years. Researches show that searching substitutes for these metals to be applied to the catalytic field has been become a research hotspot in recent years because molybdenum carbide has the same catalytic property as that of platinum group metals within a great range.

Transition metal carbides, as a kind of novel functional materials having high hardness, good stability and corrosion resistance, have been applied in the mechanical fields of high temperature resistance, abrasion resistance and chemical corrosion resistance. In recent years, molybdenum carbide becomes one hotspot in the research field of novel inorganic catalytic materials due to its unique electronic structure and excellent catalytic property. Due to some properties of notable metals, such as strong dissociation and hydrogen absorption capability, the transition metal carbide is widely applied to catalysts in reactions where hydrogen involves, such as alkane isomerization, unsaturated hydrocarbon hydrogenation, $CO(CO_2)$ hydrogenation, hydrodesulfurization and denitrification, ammonia synthesis and the like. Especially, transition metal carbide is cheaper than notable metal and has good sulfur poisoning resistance, so it is impressive.

At present, methods for preparing transition metal carbides mainly include a temperature programming reaction (TPR) method, a high-temperature carbonization method, a carbonthermal reduction (CTR) method and a chemical vapor deposition (CVD) method. However, these preparation methods are generally tedious in process and high in energy consumption.

For example, CN105214704A adopts a temperature programming reaction (TPR) method, in which carbonization is performed by using molybdenum trioxide as a molybdenum source, $CH_4$ as a carbon source and $H_2$ as a reducing gas and carbonizing under the $CH_4/H_2$ (1:3) mixed gas by controlling the heating rates at different stages to obtain transition metal carbides. This method is slow in temperature programming rate, long in preparation time and difficult in mass production. At the same time, it's needs lots of $CH_4$ and dangerous gases, has the potential safety hazard in the process of practical production, and is difficult to safely produce on large scale.

For another example, CN1176312A uses a high-temperature carbonization method in which carbon black is used as a carbon source, mixed with molybdenum oxide and then directly roasted at high temperature to be carbonized at the temperature heated to above 1600° C., and the prepared transition metal carbide has some disadvantages such as small specific surface area, high energy consumption, serious carbon deposition on the surface of the catalyst and so on. Due to different types of carbon-containing organic matters, this method has higher requirements for a non-oxygen atmosphere in a reaction environment, and has large difficulty in practical large-scale production.

For another example, CN108163857A adopts a carbothermal reduction (CTR) method in which $MoS_2$ or molybdenum concentrate, iron oxide or iron, and a carbonaceous reducing agent are used as main raw materials, the above raw materials are mixed in a certain proportion, briquetted and formed, the pressed samples are put into a high-temperature furnace under the protection of inert atmosphere to react for a while, and the reaction products are subjected to acid leaching treatment and the filtered, so as to obtain the transition metal carbide. This method is tedious in preparation process, high in preparation temperature, large in energy consumption and difficult to industrialize.

For another example, Nagai M. et al. adopt a chemical vapor deposition method, that is, the precursors containing molybdenum and carbon are gasified, and then deposited on a pre-placed substrate or container through chemical vapor reaction. This method can prepare a thin nano membrane, but needs high reaction temperature, requires high equipment air impermeability, and difficultly realizes large-scale production.

SUMMARY

The main object of the present application provides a supported transition metal carbide catalyst and a one-step synthesis method thereof to overcome the defects of the prior art.

In order to realize the above-mentioned object, the technical solution adopted by the present application includes:

An embodiment of the present application provides a one-step method for synthesizing a supported transition metal carbide catalyst, comprising:

mixing a supporter, a transition metal precursor and a solid carbon source and then grinding to form a solid mixture; and putting the solid mixture into a reducing atmosphere, carbonizing at 200-500° C., then carrying out high-temperature programming reduction carburization treatment at 700-900° C., and then at a protective atmosphere, cooling and passivating, so as to obtain the supported transition metal carbide catalyst.

In some preferred embodiments, the method specifically comprises: putting the solid mixture in a reducing atmosphere, and heating to 200-500° C. at the heating rate of 1-30° C.·min$^{-1}$ for carbonization treatment.

Further, the method also comprises: after carbonization treatment, heating the obtained mixed reactant to 700-900° C. in the reducing atmosphere at the heating rate of 0.5-5°

C.·min$^{-1}$ to perform high-temperature programming reduction carburization for 0.5-4 h.

An embodiment of the present application also provides the supported transition metal carbide catalyst prepared by any above-mentioned method.

Compared with the prior art, the present application discloses a supported transition metal carbide catalyst and a one-step synthesis method thereof. The synthesis method comprises: mixing a supporter, a transition metal precursor and a solid carbon source and then grinding to form a solid mixture; and putting the solid mixture in the reducing atmosphere, performing carbonization treatment and high-temperature programming thermal treatment in turn, and then at a protective atmosphere, cooling and passivating, so as to obtain the supported transition metal carbide catalyst.

Compared with the prior art, the synthesis method provided by the present application utilizes high-temperature solid solution reaction for one-step synthesis, which at least has the following advantages:

1. The preparation process flow is simple so processes such as impregnation and carburization with a gas carbon source (methane and ethane) can be avoided, different solid carbon sources are used in the preparation process via carburization to replace gas carbon sources, and thus preparation of 10 g of catalyst can save at least about 140 L of gas carbon source;
2. Different supporters can be used for catalyst modification, and the prepared supported transition metal carbide catalysts have the characteristics of large outer surface area, rich notable metal-like catalytic property and other features;
3. The prepared supported transition metal carbide catalyst is environmental-friendly, safe, available in raw materials and low in cost, and has the advantages of environmental friendliness and the like;
4. The prepared supported transition metal carbide catalyst can be produced in mass, maximally prepared according to demand and industrially prepared, and has wide application prospect.

DETAILED DESCRIPTION OF THE EMBODIMENTS

Figure 1:
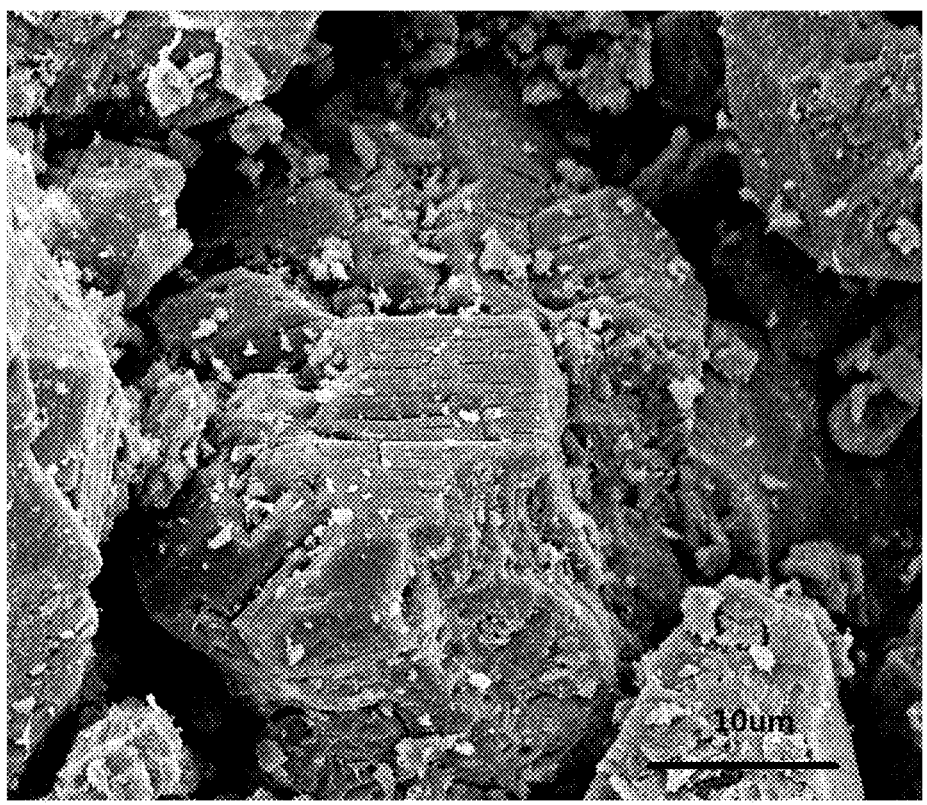
FIG. 1 is a microstructure graph of a supported transition metal carbide catalyst according to example 1 of the present application.

In view of the defects in the prior art, the inventors put forward the technical solution of the present application through long-term researches and many practices. Next, the technical solution as well as the implementation process and principle thereof and the like will be further explained and described.

An embodiment of the present application provides a one-step method for synthesizing a supported transition metal carbide catalyst, comprising:

mixing a supporter, a transition metal precursor and a solid carbon source and then grinding to form a solid mixture; and putting the solid mixture into a reducing atmosphere, carbonizing at 200-500° C., then carrying out high-temperature programming reduction carburization treatment at 700-900° C., and then at a protective atmosphere, cooling and passivating, so as to obtain the supported transition metal carbide catalyst.

In some embodiments, the method can comprise the following steps:

(1) carrying out ultrasonic fusion on the supporter, the transition metal precursor and the solid carbon source, then putting into a mortar to be evenly and mechanically ground to obtain a solid mixture;

(2) carrying out carburization and high-temperature programming thermal treatment on the solid mixture in turn at the reducing atmosphere at the thermal treatment temperature of 700-900° C. for 0.5-4 h, and then at a protective atmosphere, cooling and passivating, so as to obtain the supported transition metal carbide catalyst.

Further, the method specifically comprises: mixing the supporter, the transition metal precursor and the solid carbon source at the temperature of 20-40° C. and then grinding for 5-60 min to form the solid mixture.

Preferably, the loading amount of the transition metal precursor on the supporter is 1 wt %-40 wt %.

Preferably, a molar ratio of transition metal precursor to solid carbon source is 1:1-3.

Further, the material of the supporter comprises any one or a combination of more than two of aluminum oxide, activated carbon and silicon oxide, but is not limited thereto.

Further, the transition metal precursor comprises any one or a combination of more than two of ammonium heptamolybdate, ammonium tungstate and ferric nitrate, but is not limited thereto.

Further, the solid carbon source comprises any one or a combination of more than two of glucose, citric acid and chitosan, but is not limited thereto.

Further, the method specifically comprises: putting the solid mixture in the reducing atmosphere, heating to 200-500° C. at the heating rate of 1-30° C.·min$^{-1}$ for carbonization treatment.

More further, the method also comprises: after the carbonization treatment, heating the obtained mixed reactant to 700-900° C. at the heating rate of 0.5-5° C.·min$^{-1}$ in the reducing atmosphere to undergo high-temperature programming thermal treatment for 0.5-4 h.

Further, the reducing atmosphere comprises H$_2$ atmosphere;

Preferably, the flow of H$_2$ used for forming the reducing atmosphere is 5-50 mL·min$^{-1}$.

Further, the protective atmosphere comprises nitrogen atmosphere.

Preferably, the flow of nitrogen used for forming the protective atmosphere is 50-1500 mL·min$^{-1}$.

An embodiment of the present application also provides the supported transition metal carbide catalyst prepared by any above-mentioned method.

Further, the catalyst comprises 1-20 wt % of molybdenum element, and meanwhile the catalyst has a mesoporous structure in which the pore diameter of the contained pores is 4-6 nm, the total pore volume is 0.1-0.3 cm$^3$·g$^{-1}$, and the specific surface area is 100-200 m$^2$·g$^{-1}$.

The preparation process flow of the supported transition metal carbide catalyst provided by an embodiment of the present application is simple, can further prepare the molybdenum carbide catalyst, so processes such as impregnation and carburization with a gas carbon source (methane and ethane) can be avoided; the supported transition metal carbide catalyst is available in raw materials, low in cost and stable in product, has large outer surface area, rich notable metal-like property and good application prospect, and catalyst modification is easily carried out.

The technical solution of the present application will be further described in combination with several examples below.

Example 1 A method for preparing a supported transition metal carbide catalyst comprises the following steps:

(1) at the temperature of 20-60° C., weighing 1 g of alumina supporter, 0.1225 g of ammonium heptamolybdate and 0.0460 g of glucose, mixing, and then grinding for 10 min to obtain a solid mixture.

(2) putting the mixture in a reducing atmosphere, heating to 300° C. at the heating rate of 10° C.·min$^{-1}$ for carbonization treatment, heating to 800° C. at the heating rate of 1° C.·min$^{-1}$ for high-temperature programming thermal treatment, holding for 1 h at 800° C., wherein the reducing atmosphere is hydrogen atmosphere, and the flow of hydrogen used for forming the hydrogen atmosphere is 30 mL·min$^{-1}$; and passivating using a protective atmosphere in the process of cooling, wherein the protective atmosphere is nitrogen atmosphere, and the flow of nitrogen used for forming the protective atmosphere is 100 mL·min$^{-1}$, thereby obtaining a supported transition metal carbide catalyst.

Figure 2:
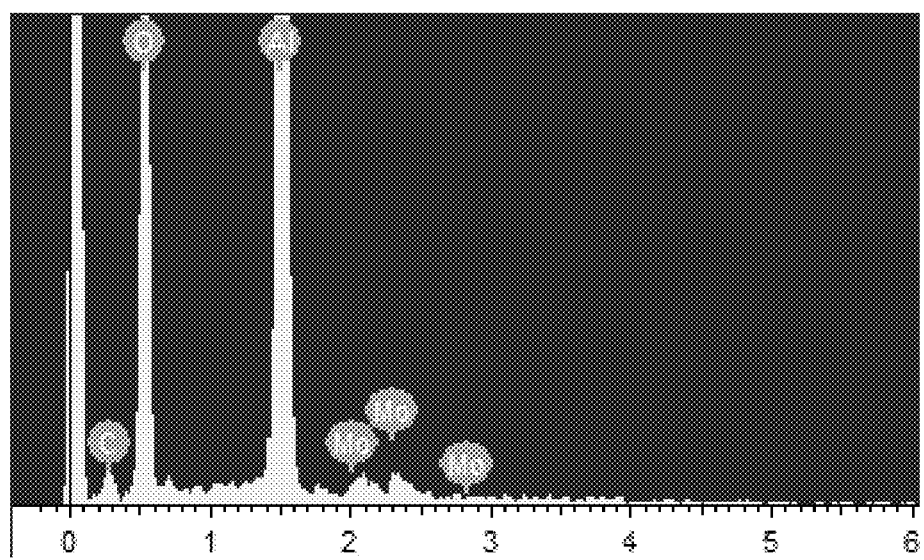
FIG. 2 is an element analysis graph of a supported transition metal carbide catalyst according to example 1 of the present application.

The supported transition metal carbide catalyst prepared in this example is named Mo$_2$C/Al$_2$O$_3$, its microstructure refers to FIG. 1, and the contents of various elements are shown in Table 1 and FIG. 2.

TABLE 1

Element Analysis Table Of Supported Transition Metal Carbide Catalyst In Example 1 Of The Present Application

| Elements | Weight percent (%) | Atom percent (%) |
| --- | --- | --- |
| C K | 7.16 | 11.73 |
| O K | 44.43 | 54.69 |
| Al K | 45.04 | 32.88 |
| Mo L | 3.38 | 0.69 |
| Total | 100.00 | 100.00 |

Figure 3:
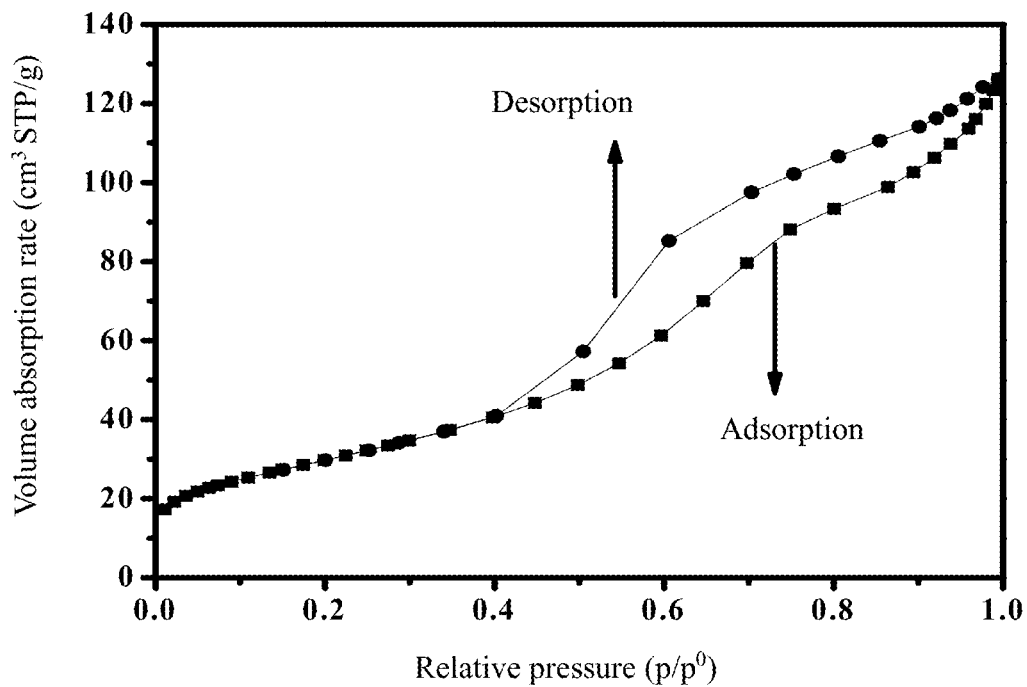
FIG. 3 is a N$_2$ adsorption-desorption curve graph of a supported transition metal carbide catalyst according to example 1 of the present application.
Figure 4:
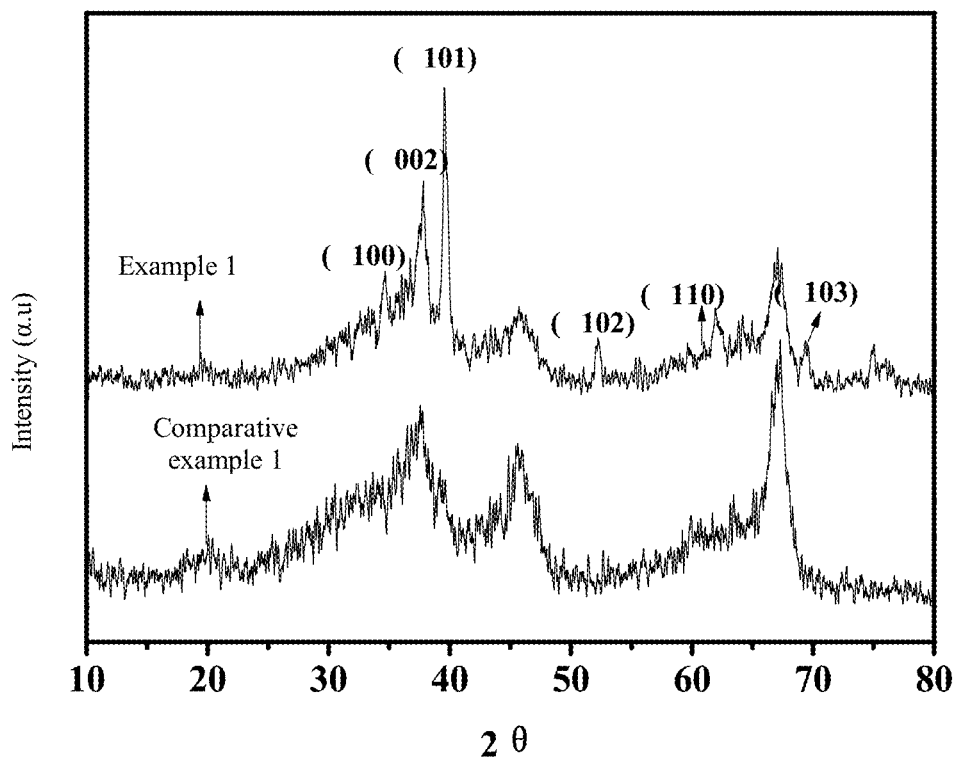
FIG. 4 is an X-ray powder diffraction spectrogram of a supported transition metal carbide catalyst according to example 1 of the present application.

As shown in Table 1 and FIG. 2, the supported transition metal carbide catalyst in example 1 contains Mo and C, and it can be seen from FIG. 1 that the method can prepare the supported transition metal carbide catalyst with a good crystal form, which is Mo$_2$C (JCPDS35-0787) (Journal of Solid State Chemistry, 2012, 194 (194): 19-22.) with a hexagonal crystal system. FIG. 3 shows a supported transition metal carbide catalyst in example 1 and a scanning electron microscope thereof. It can be seen that the surface of the supported transition metal carbide catalyst in example 1 of the present application is supported with a molybdenum carbide catalyst, and the total pore volume is 0.1985 cm$^3$·g$^{-1}$, the specific surface area is 109.0253 m$^2$·g$^{-1}$, the pore diameter of the mesoporous structure is 4.9319 nm, and the content of molybdenum element is 3.38 wt %. It can be seen from FIG. 4 that the molybdenum carbide catalyst can be well prepared in example 1 of the present application.

Example 2 A method for preparing a supported transition metal carbide catalyst comprises the following steps:

(1) at the temperature of 20-60° C., weighing 0.1151 g of ammonium tungstate and 1 g of chitosan, mixing, and grinding for 10 min to obtain a solid mixture.

(2) putting the mixture in a reducing atmosphere, heating to 300° C. at the heating rate of 10° C.·min$^{-1}$ for carbonization treatment, heating to 900° C. at the heating rate of 1° C.·min$^{-1}$ for high-temperature programming thermal treatment, wherein the protective atmosphere includes nitrogen atmosphere, the flow of hydrogen used for forming the reducing atmosphere is 100 mL·min$^{-1}$, and the activated carbon is a reducing agent; and passivating using the protective atmosphere in the process of cooling, wherein the protective atmosphere is nitrogen atmosphere, and the flow of nitrogen used for forming the protective atmosphere is 100 mL·min$^{-1}$, thereby obtaining a supported transition metal carbide catalyst. The supported transition metal carbide catalyst prepared in this example is named W$_x$C/Al$_2$O$_3$, and x is 1 or 2.

Example 3 A method for preparing a supported transition metal carbide catalyst comprises the following steps:

(1) at the temperature of 20-60° C., weighing 1 g of alumina supporter, 0.5235 g of ferric nitrate and 0.0856 g of glucose, mixing, and grinding for 10 min to obtain a solid mixture.

(2) putting the mixture in a reducing atmosphere, heating to 300° C. at the heating rate of 10° C.·min$^{-1}$ for carbonization treatment, heating to 800° C. at the heating rate of 1° C.·min$^{-1}$ for high-temperature programming thermal treatment, wherein the reducing atmosphere is hydrogen atmosphere, and the flow of hydrogen used for forming the reducing atmosphere is 30 mL·min$^{-1}$; and passivating using a protective atmosphere in the process of cooling, wherein the protective atmosphere is nitrogen atmosphere, and the flow of nitrogen used for forming the protective atmosphere is 100 mL·min$^{-1}$, thereby obtaining a supported transition metal carbide catalyst. The supported transition metal carbide catalyst prepared in this example is named Fe$_x$C/Al$_2$O$_3$.

Example 4 A method for preparing a supported transition metal carbide catalyst comprises the following steps:

(1) this step is the same as that in example 1, but the molar ratio of transition metal precursor to solid carbon source is 1:3;

(2) putting the mixture in a reducing atmosphere, heating to 200° C. at the heating rate of 30° C.·min$^{-1}$ for carbonization treatment, heating to 900° C. at the heating rate of 5° C.·min$^{-1}$ for high-temperature programming thermal treatment, and holding for 0.5 h at 900° C., wherein the reducing atmosphere is hydrogen atmosphere, and the flow of hydrogen used for forming the reducing atmosphere is 5 mL·min$^{-1}$; and passivating using a protective atmosphere in the process of cooling, wherein the protective atmosphere is nitrogen atmosphere, and the flow of nitrogen used for forming the protective atmosphere is 1500 mL·min$^{-1}$, thereby obtaining a supported transition metal carbide catalyst.

Example 5 A method for preparing a supported transition metal carbide catalyst comprises the following steps:

(1) this step is the same as that in example 1, but a molar ratio of transition metal precursor to solid carbon source is 1:3;

(2) putting the mixture in a reducing atmosphere, heating to 500° C. at the heating rate of 30° C.·min$^{-1}$ for carbonization treatment, heating to 700° C. at the heating rate of 0.5° C.·min$^{1}$ for high-temperature programming thermal treatment, and holding for 4 h at 700° C., wherein the reducing atmosphere is a hydrogen atmosphere, and the flow of hydrogen used for forming the reducing atmosphere is 50 mL·min$^{-1}$; and passivating using a protective atmosphere in the process of cooling, wherein the protective atmosphere is nitrogen atmosphere, and the flow of nitrogen used for forming the protective atmosphere is 50 mL·min$^{-1}$, thereby obtaining a supported transition metal carbide catalyst.

Comparative Example 1 the method in this comparative example is the same as that in example 1, and the difference is that step (1) is not contained, the alumina supporter is directly used to replace the mixture to carry out operation in step (2).

Comparative Example 2

Step (1) is the same as that in example 1.

Step (2) differs from that of example 1 that the mixture is put in the reducing atmosphere, heated to 300° C. at the heating rate of 10° C.·min$^{-1}$ for carbonization treatment, and then rapidly heated to 800° C. for thermal treatment.

Wherein, in comparative example 1, the supporter $Al_2O_3$ is used as blank control. In the heat treatment step of comparative example 2, the carburization and reduction processes can not be sufficiently carried out due to too fast heating (the heating rate is about 40° C.·min$^{-1}$), and the supported catalyst prepared at this rate cannot obtain molybdenum carbide or a small amount of molybdenum carbide.

In addition, the inventors of this case also perform corresponding tests with reference to examples 1-3 based on other raw materials and process conditions mentioned in this specification, and find that corresponding supported carbide catalysts can also be prepared through these tests, and meanwhile these catalysts also have ideal catalytic performances.

The preceding examples of the present application provide the method for preparing the supported transition metal carbide catalyst by utilizing high temperature solid fusion reaction. The preparation method is simple in process, so the introduction of a gas carbon source (methane and ethane) and other flammable gases is avoided in the process of preparation, so as to reduce the dangerousness of the operation process. Furthermore, the catalyst can be conveniently modified by further adjusting the content of the precursor and the content of the solid carbon source, the compositions and properties of the obtained supported transition metal carbide catalyst can be controlled, and the catalysis behavior of the formed catalyst is further adjusted. The obtained supported transition metal carbide catalyst is safe, easy to control, environmental-friendly, low in cost, high in preparation efficiency, high in product quality and high in yield. The supported transition metal carbide catalyst prepared in the preceding examples of the present application contains small molybdenum carbide particles and large specific surface, is beneficial to reactant diffusion and exposure of active sites, and meanwhile the molybdenum carbide catalyst with a small amount of surface area carbon can be obtained by helping the uniform reaction of the precursor via mechanical grinding. Moreover, catalyst modification is conveniently carried out, which is beneficial to improvement of properties of the catalyst. The obtained supported transition metal carbide catalyst has good application and industrialization prospect.

It should be understood that the above examples are only for illustrating the technical concept and features of the present application for the purpose of enabling those familiar with the technology to understand the content of the present application and implement it accordingly, but not limit the protective scope of the present application. All equivalent changes or modifications made according to the spirit of the present application shall fall within the scope of protection of the present application.

What is claimed is:

1. A one-step method for synthesizing a supported transition metal carbide catalyst, comprising:
   mixing a supporter, a transition metal precursor, and a solid carbon source to obtain a mixture;
   grinding the mixture to form a solid mixture; and
   putting the solid mixture into a reducing atmosphere, performing a carbonization treatment on the solid mixture at 200-500° C. to obtain a carbonized mixture, carrying out a high-temperature programming reduction carburization treatment on the carbonized mixture at 700-900° C., holding for 0.5-4 h at 700-900° C. to obtain a treated mixture, and then putting the treated mixture in a protective atmosphere, cooling and passivating the treated mixture, to obtain the supported transition metal carbide catalyst;
   where the material of the supporter comprises aluminum oxide or silicon oxide; and
   wherein the solid carbon source comprises at least one selected from the group consisting of citric acid and chitosan.

2. The one-step method for synthesizing the supported transition metal carbide catalyst according to claim 1, comprising: at a temperature of 20-60° C., mixing the supporter, the transition metal precursor, and the solid carbon source to obtain the mixture and then grinding the mixture for 5-60 min to form the solid mixture.

3. The one-step method for synthesizing the supported transition metal carbide catalyst according to claim 2, wherein a material of the transition metal precursor comprises at least one selected from the group consisting of ammonium heptamolybdate and ferric nitrate.

4. The one-step method for synthesizing the supported transition metal carbide catalyst according to claim 1, wherein a loading amount of the transition metal precursor on the supporter is 1 wt %-40 wt %, and a molar ratio of the transition metal precursor to the solid carbon source is 1:1-3.

5. The one-step method for synthesizing the supported transition metal carbide catalyst according to claim 1, wherein a material of the transition metal precursor comprises at least one selected from the group consisting of ammonium heptamolybdate, ammonium tungstate and ferric nitrate.

6. The one-step method for synthesizing the supported transition metal carbide catalyst according to claim 1, comprising: putting the solid mixture in the reducing atmosphere, and heating the solid mixture to 200-500° C. at a heating rate of 1-30° C.·min$^{-1}$ for the carbonization treatment.

7. The one-step method for synthesizing the supported transition metal carbide catalyst according to claim 6, comprising: after the carbonization treatment, heating the carbonized mixture to 800-900° C. at a heating rate of 0.5-5° C. min$^{-1}$ to perform the high-temperature programming reduction carburization treatment for 0.5-4 h.

8. The one-step method for synthesizing the supported transition metal carbide catalyst according to claim 6, wherein the reducing atmosphere comprises a $H_2$ atmosphere; and/or a flow of $H_2$ used for forming the reducing atmosphere is 5-50 mL min$^{-1}$.

9. The one-step method for synthesizing the supported transition metal carbide catalyst according to claim 5, wherein the reducing atmosphere comprises a $H_2$ atmosphere; and/or a flow of $H_2$ used for forming the reducing atmosphere is 5-50 mL min$^{-1}$.

10. The one-step method for synthesizing the supported transition metal carbide catalyst according to claim 1, wherein the reducing atmosphere comprises a $H_2$ atmosphere; and/or a flow of $H_2$ used for forming the reducing atmosphere is 5-50 mL min$^{-1}$.

11. The one-step method for synthesizing the supported transition metal carbide catalyst according to claim 1, wherein the protective atmosphere comprises a nitrogen atmosphere; and/or a flow of nitrogen used for forming the protective atmosphere is 50-1500 mL min$^{-1}$.

12. The one-step method for synthesizing the supported transition metal carbide catalyst according to claim 1, wherein the carbonization treatment on the solid mixture is at 300-500° C. to obtain the carbonized mixture.

13. The one-step method for synthesizing the supported transition metal carbide catalyst according to claim 1, wherein the material of the supporter consists of aluminum oxide.

14. The one-step method for synthesizing the supported transition metal carbide catalyst according to claim 1, wherein the material of the supporter consists of silicon oxide.

15. The one-step method for synthesizing the supported transition metal carbide catalyst according to claim 1, wherein the transition metal precursor is ferric nitrate.

\* \* \* \* \*